(12) United States Patent
Giannetti et al.

(10) Patent No.: US 8,817,324 B2
(45) Date of Patent: Aug. 26, 2014

(54) METHOD AND SYSTEM FOR AGGREGATING PRINT JOBS

(75) Inventors: Fabio Giannetti, Los Gatos, CA (US); Benjamin I. Dempster, San Francisco, CA (US); Kok-Wei Koh, Mountain View, CA (US); Alysha Naples, San Francisco (CA); Jose Manuel Perez, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 44 days.

(21) Appl. No.: 13/700,831

(22) PCT Filed: Jun. 11, 2010

(86) PCT No.: PCT/US2010/038399
§ 371 (c)(1),
(2), (4) Date: Nov. 29, 2012

(87) PCT Pub. No.: WO2011/155950
PCT Pub. Date: Dec. 15, 2011

(65) Prior Publication Data
US 2013/0094033 A1 Apr. 18, 2013

(51) Int. Cl.
*G06K 15/00* (2006.01)
*G06F 3/12* (2006.01)
*H04N 1/00* (2006.01)
*G06K 15/02* (2006.01)

(52) U.S. Cl.
CPC ............ *G06K 15/024* (2013.01); *G06F 3/1262* (2013.01); *G06F 3/1264* (2013.01); *G06F 3/1282* (2013.01); *G06F 3/1251* (2013.01); *G06F 3/1204* (2013.01)
USPC ......... 358/1.6; 358/1.12; 358/1.15; 358/1.16; 358/1.18

(58) Field of Classification Search
USPC ............... 358/1.6, 1.18, 1.12, 451, 540, 448, 358/1.16, 1.15; 382/296, 298, 299, 312, 382/284; 715/246, 251, 253, 273, 256, 254, 715/244, 245, 247
See application file for complete search history.

(56) References Cited

U.S. PATENT DOCUMENTS

| 6,792,987 | B2 | 9/2004 | Monroe |
| 6,891,642 | B1 * | 5/2005 | Shigehiro ...................... 358/450 |
| 7,812,997 | B2 * | 10/2010 | Morales et al. .............. 358/1.18 |

(Continued)

FOREIGN PATENT DOCUMENTS

| CN | 2501816 Y | 7/2002 |
| JP | 2005-319666 A | 11/2005 |

OTHER PUBLICATIONS

International Search Report, dated Feb. 23, 2011, for Application No. PCT/US2010/038399, filed Jun. 11, 2010, 8 pages.

*Primary Examiner* — Ngon Nguyen (57) ABSTRACT

The present disclosure provides methods and systems for aggregating print jobs of different lengths and/or customers to decrease the need for rewinding and splicing operations. An exemplary embodiment provides a method that comprises identifying individual label-printing jobs (1-8) that can be aggregated onto a roll of substrate (302), and forming an aggregated label-printing job (300). In the aggregated label-printing job (300) a longest print job (8) is imposed adjacent to a first end of the roll of substrate (302), and one or more shorter print jobs (2, 5, 7) are imposed adjacent to the longest print job (8) in the direction of a second end of the roll of substrate (302).

15 Claims, 6 Drawing Sheets

(56) References Cited

U.S. PATENT DOCUMENTS

| | | | |
|---|---|---|---|
| 2001/0051964 A1* | 12/2001 | Warmus et al. | ............... 707/530 |
| 2003/0106637 A1 | 6/2003 | Kimble | |
| 2004/0003342 A1* | 1/2004 | Keane et al. | ................. 715/500 |
| 2005/0234835 A1 | 10/2005 | Stonoha et al. | |
| 2008/0025778 A1 | 1/2008 | Ito et al. | |
| 2008/0196819 A1 | 8/2008 | Hafner | |
| 2010/0014109 A1 | 1/2010 | Debaere | |
| 2010/0021651 A1 | 1/2010 | Baldwin et al. | |
| 2010/0051179 A1 | 3/2010 | Eder et al. | |
| 2012/0279409 A1* | 11/2012 | Aylward et al. | ............... 101/483 |

\* cited by examiner

METHOD AND SYSTEM FOR AGGREGATING PRINT JOBS

BACKGROUND

The production of packaging and container labels typically consists of printing on a flexographic or digital press, followed by a finishing process that may include cutting, splicing, and rewinding. The aggregation of different labels onto a single frame is an important part of the printing process. However, this action usually introduces a sizable amount of processing work during the finishing stage. The processing work is related to splicing, which is the combining of multiple small rolls of the same label into one continuous large one, and rewinding, which is the winding and unwinding of a roll to join the multiple small rolls together.

When several label jobs are aggregated together, the jobs may have a different overall length. A step and repeat approach may be used to place the individual labels on a substrate. This approach may result in the generation of several sub rolls that need to be rewound and spliced together. The rewind step can be time consuming and the time may depend on the label size. Larger labels require less time for a rewind, because the roll may be less prone to break. Generally, it may take about 20-30 min, on average, to perform the rewinding and spicing operation. This operation may take more time than the time it takes to actually print and die cut the labels. Further, depending on the label size, no more than three rolls can be spliced together and sustain the tension imposed by a label application machine without breaking.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Exemplary embodiments of the present invention provide a method and a system for label imposition of multiple orders to minimize splicing and rewinding. The proposed idea is to aggregate label-printing jobs based on not only die cut, color requirements, and substrate, but also based on job length. The longest job will be placed at one edge of a substrate, and then jobs will be arranged from that edge to the opposite edge based on the length of each job, with the shortest jobs combined along the opposite edge from the longest job. Exemplary embodiments reduce the amount of splicing required to make master rolls from stub rolls, in most cases to zero, enabling the rewind operation to be simple and fast. Often, only one rewind may be needed.

Figure 1:
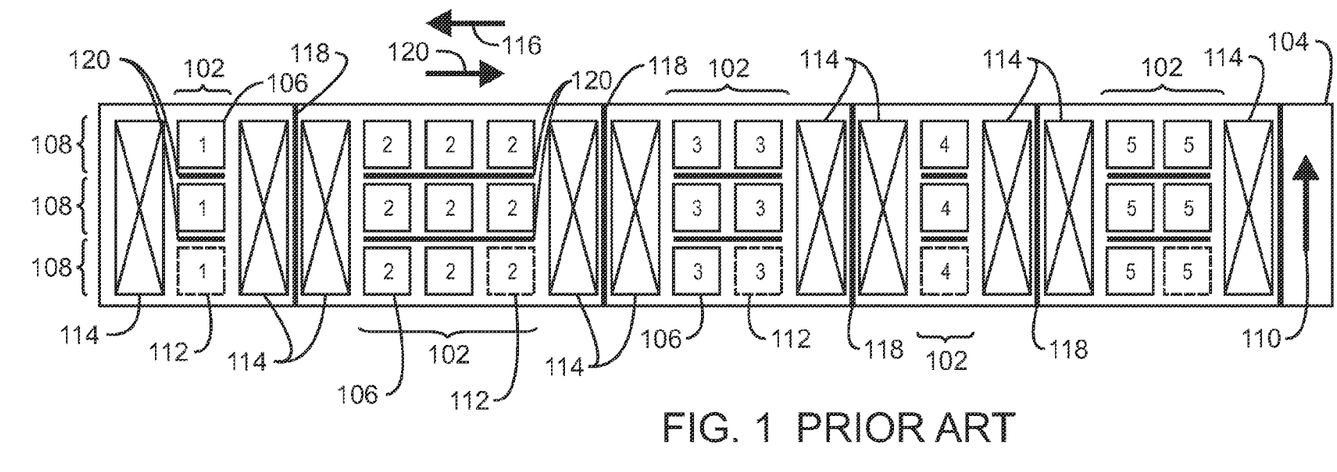
FIG. 1 is a drawing of a current step and repeat imposition process.

FIG. 1 is a drawing of a current step and repeat imposition process. In the step and repeat process, individual jobs 102 are arranged, or imposed, on the surface of the substrate 104 separately from other jobs 102. In each job 102, the labels 106 can be arranged in rows 108 across the substrate, for example, from the bottom to the top of a roll of substrate 104, as indicated by an arrow 110. Each job 102 ends with one or more retain labels 112 that bring the labels in a last row 108 to an end at the same point as labels 106 in other rows 108. Each job 102 is isolated from other jobs 102 by a header 114, which may be placed before and after the job 102. The jobs 102 are printed from the first job 102, labeled 1 in this example, to a last job 102, labeled 5 in this example, as indicated by a print direction arrow 116.

After printing, the jobs 102 may be separated by rewinding the substrate 104 and cutting along lines 118 between the headers 114 to form separate job rolls. After the individual jobs 102 are on the job rolls, they may be processed again to separate the individual rows 108 of labels 106 onto label rolls, by rewinding from each job roll in the direction of the second arrow 120 and cutting along the lines 122 between rows to form label rolls. The individual label rolls may then be spliced to form master rolls by splicing an end of a label roll to the end of a next label roll, and winding from one label roll onto the other label roll.

Figure 2:
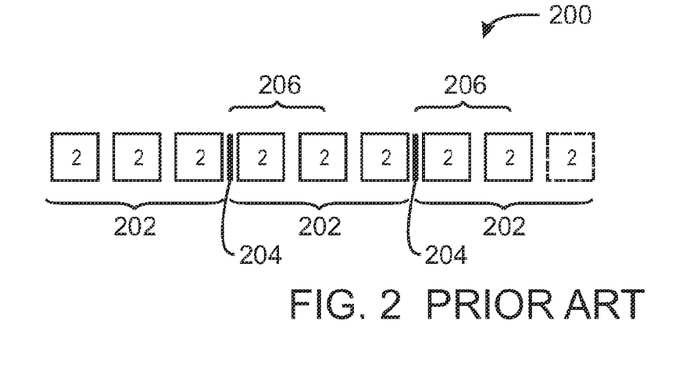
FIG. 2 is a drawing of a master roll of spliced labels made using the imposition procedure of FIG. 1.

FIG. 2 is a drawing of a master roll 200 of spliced labels made using the imposition procedure of FIG. 1. The master roll 200 may be formed by joining individual label rolls 202, for example, formed by the rewinding and cutting process described above. A seam 204 can be formed by overlapping a portion 206 of a label roll 202 with another label roll 202. For example, five labels can be removed from an end of one label roll 202 and the end glued to a bottom of the next roll 202.

The process described above may add a significant amount of cost to the production process, since each rewinding operation adds to the production time. Further, as noted previously, the size of the labels may determine how many individual label rolls 202 can be spliced. Labels may not have the physical strength to allow more than about three splices, because the overall roll strength will be not enough to support the application machine stress. In addition, the step and repeat process may waste substrate because of the headers inserted between jobs. In an exemplary embodiment, label jobs can be aggregated on a single substrate to minimize the number of rewind and splicing operations needed.

Figure 3:
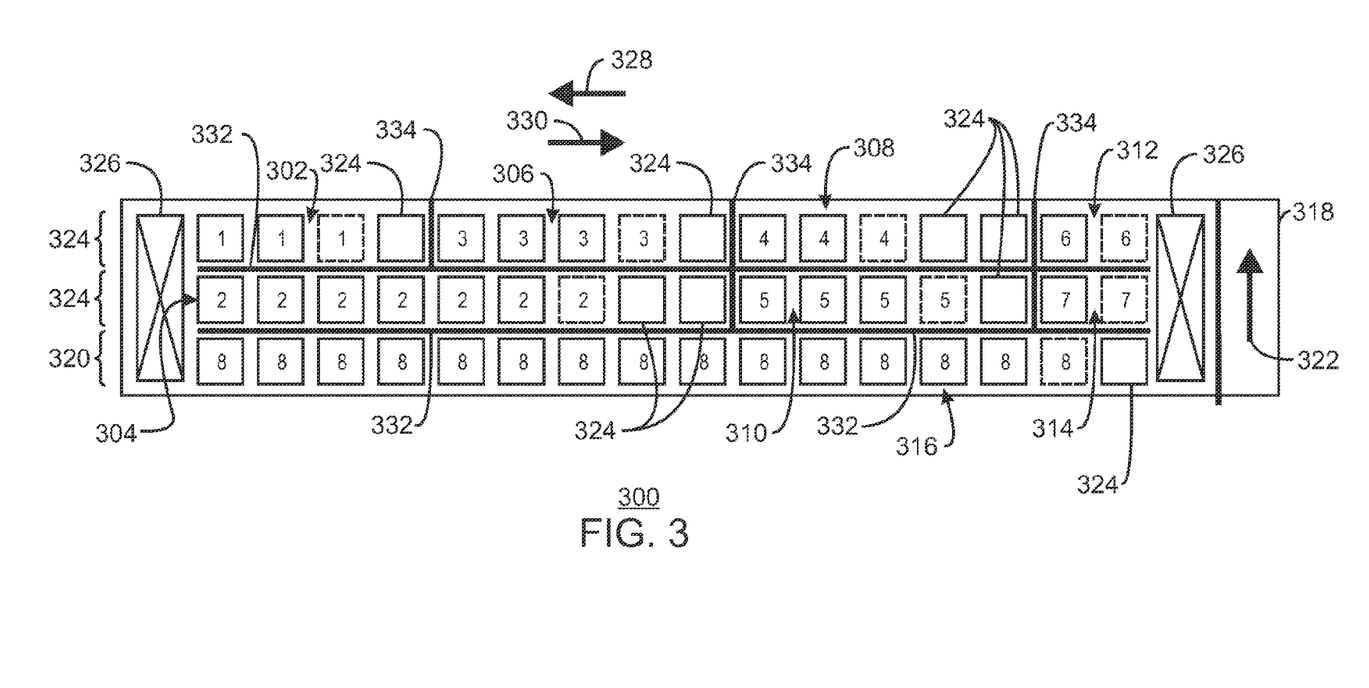
FIG. 3 is a drawing of an aggregated label-printing job that minimizes label rewind and splicing operations, in accordance with an exemplary embodiment of the present invention.

FIG. 3 is a drawing of an aggregated label-printing job 300 that minimizes label rewind and splicing operations, in accordance with an exemplary embodiment of the present invention. In this example, the individual label-printing jobs are labeled 302-316, and are of various lengths, with job 316 being the longest and jobs 312 and 314 being the shortest. In an exemplary embodiment, the jobs 302-316 are aggregated in which the longest job 316 is placed at one edge of the substrate 318, for example, in a row 320 at the bottom of the roll of substrate 318. The top of the roll of substrate 318 is indicated by an arrow 322 on a roll header. The other jobs 302-314 are selected and imposed on the roll of substrate 302 in other rows 324 and arranged to end the jobs, for example, jobs 312-316, at the same point on the roll of substrate 318.

Dummy labels 324 mark the end of any job, such as jobs 302-310 and 316, that ends before another job or before a header 326. Further, dummy labels 324 can be inserted to end multiple jobs, for example, jobs 304 and 306, jobs 308 and 310, or jobs 312-316, at the same point, decreasing the number of times the rewinding process is stopped and restarted. A header 326 may be imposed before and after the aggregated label-printing job 300 to mark the beginning and end of the aggregated label-printing job 300.

The aggregated label-printing job 300 is printed in a first direction 328 and rolled as the printing is performed. Once printing is completed, a single rewinding process, in the direction indicated by arrow 330, may suffice to separate all of the individual jobs onto master rolls, without multiple rewinding or splicing operations. This can be performed by cutting along cut lines 332 between the rows 320, 324, and pausing the aggregated label-printing job 300 when a cross cut 334 is used to separate smaller jobs, such as between jobs 302 and 306, or after jobs 304 and 306, and jobs 308 and 310.

As shown in FIG. 3, exemplary embodiments of the present invention may eliminate the need for splicing by producing a single master roll for each of the jobs 302-316. Moreover, the rewinding operation may be performed only once. As noted above, the rewinding can be paused at points where the operator will cut the roll portion for a certain customer and then reattach the remaining labels to a new roll. While this is done, the longest runs, located at the bottom of the roll can continue to rewind. The arrow 322 on the roll header may be repeated as a trailer, or on each of the headers 326, since the roll may be rewound a few times from printing to die cutting. At each of the dummy labels 324, the operator can pause the rewind operation to start a new roll. When the rewinding of the roll of aggregated label-printing jobs 300 is finished, all the jobs will have been separated and are ready to be shipped. The jobs 302-316 above are merely examples used to explain exemplary embodiments. An actual job will have far more labels in each job than the example shown. Further, the labels of the jobs do not have to have the same shape or size for aggregation. Unique multi-format dies may be made for each combination of jobs, with the costs for the multi-format dies shared between the buyers. The present invention may be more clearly understood by examining another example of an aggregated printing job, as shown in FIG. 4.

Figure 4:
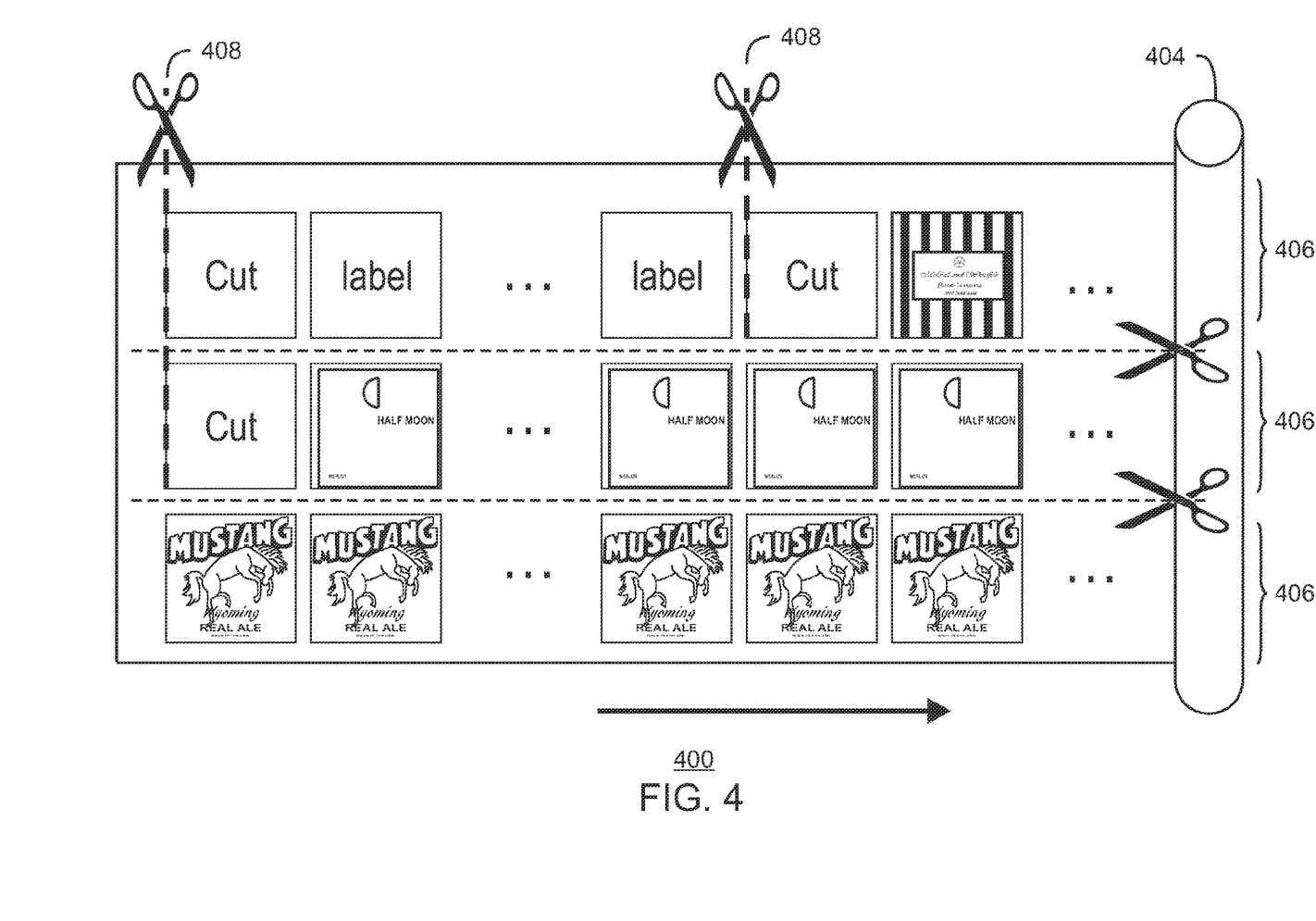
FIG. 4 is a drawing of an aggregated print job, in accordance with an exemplary embodiment of the present invention.

FIG. 4 is a drawing of an aggregated print job 400, in accordance with an exemplary embodiment of the present invention. In the aggregated print job 400, the longest individual job is placed in a row 402 along one edge of the roll of substrate 404, for example, at the bottom. Shorter jobs are imposed in other rows 406, placed so that all of the jobs end at the same point. Further, the shorter jobs may be imposed to create cut points 408 along the rows 402 and 406, using a top to bottom strategy that enables replacing sub-rolls during rewinding. The method for aggregating jobs as discussed with respect to FIGS. 3 and 4 is discussed with respect to FIG. 5.

Figure 5:
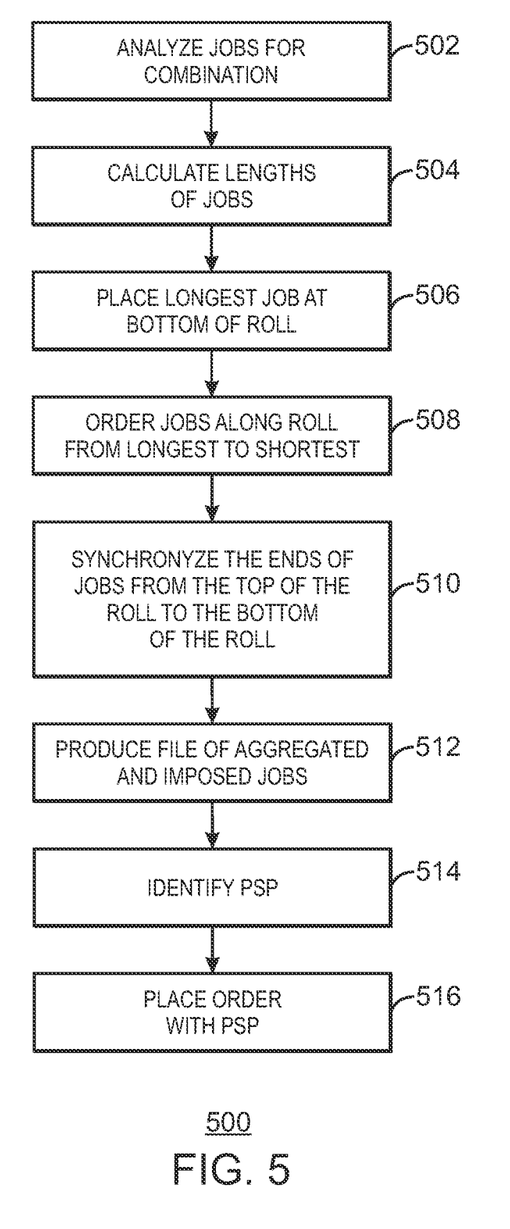
FIG. 5 is a process flow diagram showing a method for aggregating print jobs to minimize splicing and rewinding operations, in accordance with exemplary embodiments of the present techniques.

FIG. 5 is a process flow diagram showing a method 500 for aggregating label-printing jobs to minimize splicing and rewinding operations, in accordance with exemplary embodiments of the present techniques. The method 500 begins at block 502 by analyzing individual label-printing jobs to determine if any can be combined. The analysis may take into account factors such as the substrate, the job lengths, the job locations, and the like. If multiple shapes or sizes are to be combined, the existence of a multi-format die at a print service provider (PSP) close to the location of the jobs may be considered.

If individual label-printing jobs can be combined, then, at block 504, the number of rows is automatically computed based on the label dimensions. At block 506, the longest run can be placed along one side of the substrate, for example, at the bottom of the roll. At block 508, the shorter runs will be combined together in the other roll portions, to require rewound jobs to be removed from the sub-rolls stack without affecting longer jobs that are still in rewinding. Dummy labels may be introduced to compensate for differences in length and to assist the rewind operator in identifying the places to cut.

At block 510, the runs are imposed to end at a same point on a roll of substrate, enabling an operator to pause the rewind operation, cut the sub roll portion, and produce sub-rolls to be sent to the different customers. Accordingly, even with a variable number of orders and a variable length of each individual order, the splicing and rewinding operations are significantly reduced. As these operations can be time consuming, often ranging from 30 minutes to 1 hour, this may save a significant amount of time in the process. Moreover, having a variable length separator between the different labels based on the labels size enables the rewind operator to tune the machine at the optimized speed and still have enough time and margin to identify a job change in order to pause the process and set up the job for separate rewinding.

At block 512, a data file is produced showing the aggregated and imposed labels of the aggregated print job. For example, the file may be a PORTABLE DOCUMENT FORMAT (.pdf) file compatible with the ADOBE ACROBAT system available from ADOBE SYSTEMS.

At block 514, a PSP capable of performing the aggregated label-printing job is identified. The identification may be made based on available substrate, location, and the like. Further, the identification may be based on the existence of multi-format dies for cutting labels of different sizes and orientation that are placed on the same substrate. At block 516, the method 500 ends when the order for the aggregated print job is with an appropriate PSP.

Figure 6:
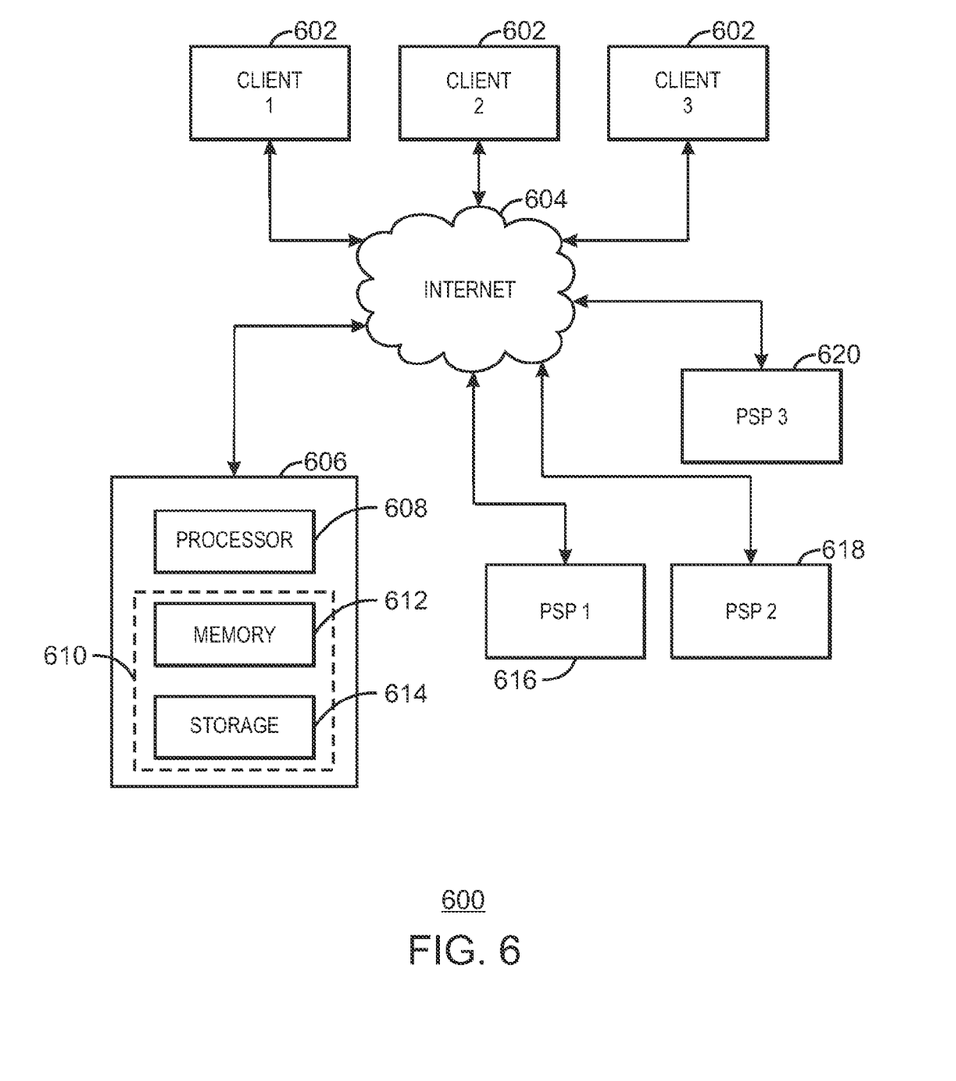
FIG. 6 is a block diagram of a system that may be used for label aggregation to minimize splicing and rewinding operations, in accordance with an exemplary embodiment of the present techniques.

FIG. 6 is a block diagram of a system that may be used for label aggregation to minimize splicing and rewinding operations, in accordance with an exemplary embodiment of the present techniques. In the system 600, a number of client systems 602 may be used by buyers to order labels over the Internet 604. However, the access is not limited to the Internet 604, as any networking technology may be used in embodiments, including local area networks (LANs), wide area networks (WANs), and the like. The client systems 602 may be used to access a print ordering system 606 to place an order for labels.

The print ordering system 606 may include a processor 608 and non-transitory, computer-readable storage media 610, such as a memory 612 and a storage system 614. The processor 608 may be a single processor or a cluster computing system. The memory 612 may include random access memory (RAM) and read-only memory (ROM). The storage system 614 may include hard drives, optical drive, RAM disks, or any number of other storage units.

The non-transitory computer-readable storage media 610 may hold software configured to obtain label orders from the client systems 602 and place labels orders with print service providers (PSPs), such as PSP 1 616, PSP 2 618, and PSP 3 620. The software may determine whether individual label-printing jobs can be aggregated, and, if so, use the method 500 discussed with respect to FIG. 5 to aggregate the jobs.

The non-transitory computer-readable storage media 610 may also hold a database of PSPs 616, 618, and 620 that includes information such as available substrates, printing technologies, and the existence of multi-format dies, among other items. The information may be useful for determining vendors that may be able to perform the aggregated jobs. However, the database does not need to contain all of the information needed to analyze the PSPs 616, 618, and 620, or even all of the possible PSPs that may be used. In embodiments, the database may access external databases to discover unknown PSPs.

Figure 7:
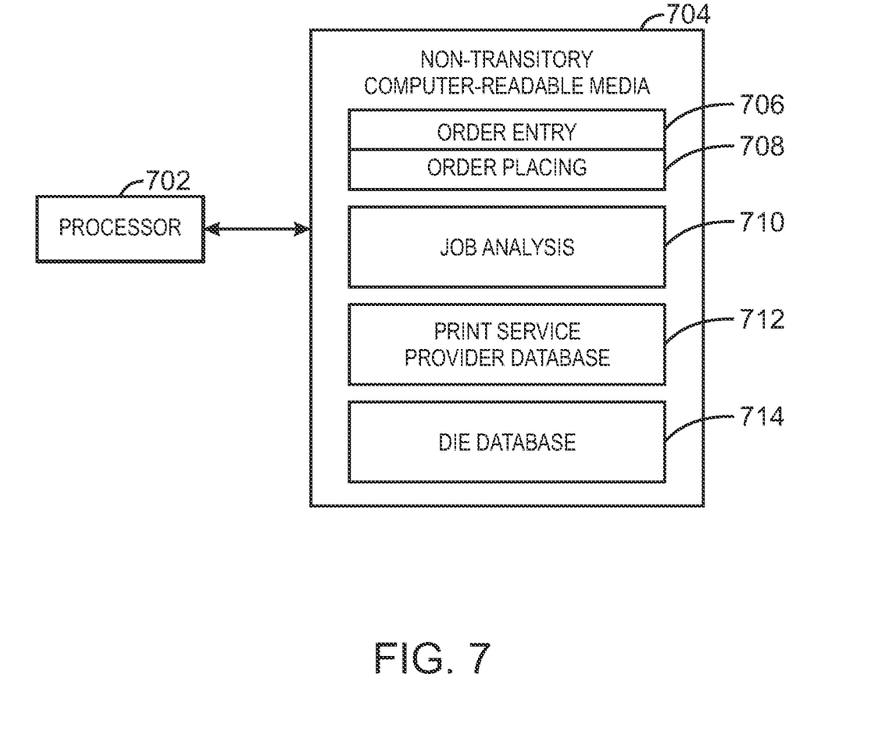
FIG. 7 is a block diagram of a non-transitory, computer-readable medium 704 that may store code modules that implement exemplary embodiments of the present invention.

FIG. 7 is a block diagram of a non-transitory, computer-readable medium that may store code modules that implement exemplary embodiments of the present invention. As shown in FIG. 7, a processor 702 may access the modules stored in the non-transitory, computer-readable medium 704. The non-transitory, computer-readable medium 704 may include various types of storage units, such as a memory or storage system. The modules may include an order entry system 706, for example, accessible to a buyer over the Internet. The modules may also include an order placement system 708 for forwarding orders to appropriate PSPs after an order analysis is complete. A job analysis module 710 may analyze jobs to determine if jobs can be aggregated and to aggregate the jobs using the method 500 of FIG. 5. A PSP database 712 may include information on PSPs, such as location, available multi-format dies, and available substrates. The PSP database may be used by the job analysis module 710 to determine where aggregated label orders can be placed. Further, the non-transitory, computer-readable medium 704 can hold a database 714 listing all available multi-format dies. The code is not limited to the modules shown in FIG. 7, but may use any arrangement or configuration of code to achieve the same functionality.

What is claimed is:

1. A print ordering system for combining individual label-printing jobs into an aggregated label-printing job, comprising:
 a processor; and
 a memory, wherein the memory comprises code configured to direct the processor to:
  identify the individual label-printing jobs that can be combined on a single roll of substrate;
  calculate a length of each of the individual label-printing jobs; and
  impose the individual label-printing jobs on the roll of substrate by imposing a longest job along one side of the roll of substrate, then imposing shorter jobs along the roll of substrate until a shortest job is imposed at the other side of the roll of substrate, wherein the roll of substrate is cut to form a master roll for each individual label-printing job, wherein the master roll for each individual label-printing job is formed without splicing.

2. The print ordering system of claim 1, wherein the memory comprises code configured to impose the individual label-printing jobs in such a way as to end the individual label-printing jobs in the aggregated label-printing job simultaneously.

3. The print ordering system of claim 1, comprising a storage system that comprises a database of print service providers.

4. The print ordering system of claim 3, wherein the database comprises a listing of multi-format dies.

5. The print ordering system of claim 1, wherein the memory comprises code configured to place a dummy label after a label-printing job to mark the end of the label-printing job.

6. The print ordering system of claim 1, wherein the memory comprises code configured to end the individual label-printing jobs that comprise the aggregated label-printing job at the same point on the roll of substrate.

7. The print ordering system of claim 1, wherein the memory comprises code configured to place a header on the roll of substrate before and after the aggregated label-printing job to mark a beginning and an end of the aggregated label-printing job.

8. The print ordering system of claim 1, wherein the memory comprises code configured to identify a print service provider that can perform the aggregated label-printing job.

9. The print ordering system of claim 8, wherein the memory comprises code configured to place the aggregated label-printing job with the print service provider.

10. The print ordering system of claim 1, wherein the memory comprises code configured to place one or more dummy labels after one or more of the individual label-printing jobs to end two or more individual label-printing jobs at a same cut point.

11. A method for aggregating label jobs, comprising:
 identifying individual label-printing jobs that can be aggregated onto a roll of substrate; and
 forming an aggregated label-printing job from the individual label-printing jobs, wherein the aggregated label-printing job has a longest individual label-printing job imposed adjacent to a first end of the roll of substrate, and one or more shorter individual label-printing jobs imposed adjacent to the longest print job; and
 separating the individual label-printing jobs from the aggregated label-printing job onto a master roll without splicing.

12. The method of claim 11, wherein identifying individual label-printing jobs that can be aggregated comprises determining that the individual label-printing jobs use a similar substrate.

13. The method of claim 11, comprising imposing the individual label-printing jobs along the roll of substrate by length from the longest individual label-printing job adjacent to the first end of the roll of substrate to a plurality of short individual label-printing jobs adjacent to a second end of the roll of substrate.

14. A non-transitory, computer-readable medium, comprising code configured to direct a processor to:
 identify individual label-printing jobs that can be imposed on a single roll of substrate; and
 form an aggregated label-printing job, wherein a longest print job is imposed along one edge of the roll of substrate and a shortest print job is imposed along an opposite edge of the roll of substrate, wherein the roll of substrate is cut to form a master roll for each individual label-printing job, wherein the master roll is formed without splicing.

15. The non-transitory, computer-readable medium of claim 14, comprising code configured to direct a processor to impose the individual label-printing jobs along the roll of substrate by length from the longest label-printing job adjacent to the one edge of the roll of substrate to a plurality of short label-printing jobs adjacent to the opposite edge of the roll of substrate.

* * * * *

UNITED STATES PATENT AND TRADEMARK OFFICE
CERTIFICATE OF CORRECTION

| | | |
|---|---|---|
| PATENT NO. | : 8,817,324 B2 | Page 1 of 1 |
| APPLICATION NO. | : 13/700831 | |
| DATED | : August 26, 2014 | |
| INVENTOR(S) | : Fabio Giannetti et al. | |

It is certified that error appears in the above-identified patent and that said Letters Patent is hereby corrected as shown below:

In the Claims

In column 6, line 24, in Claim 11, after "substrate;" delete "and".

Signed and Sealed this
Thirtieth Day of December, 2014

Michelle K. Lee
*Deputy Director of the United States Patent and Trademark Office*